M. BIRKIGT.
MOTOR VEHICLE.
APPLICATION FILED MAR. 28, 1919.
1,312,383.
Patented Aug. 5, 1919.
3 SHEETS—SHEET 1.
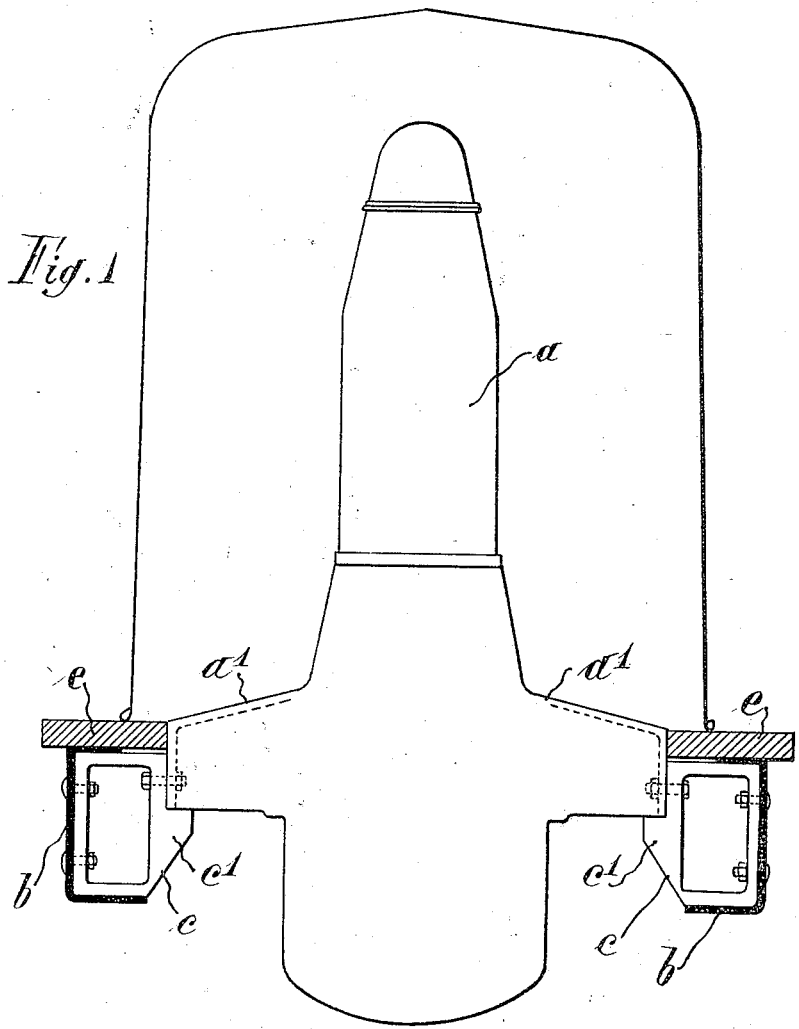
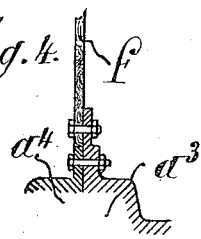

M. BIRKIGT.
MOTOR VEHICLE.
APPLICATION FILED MAR. 28, 1919.

1,312,383.

Patented Aug. 5, 1919.
3 SHEETS—SHEET 2.

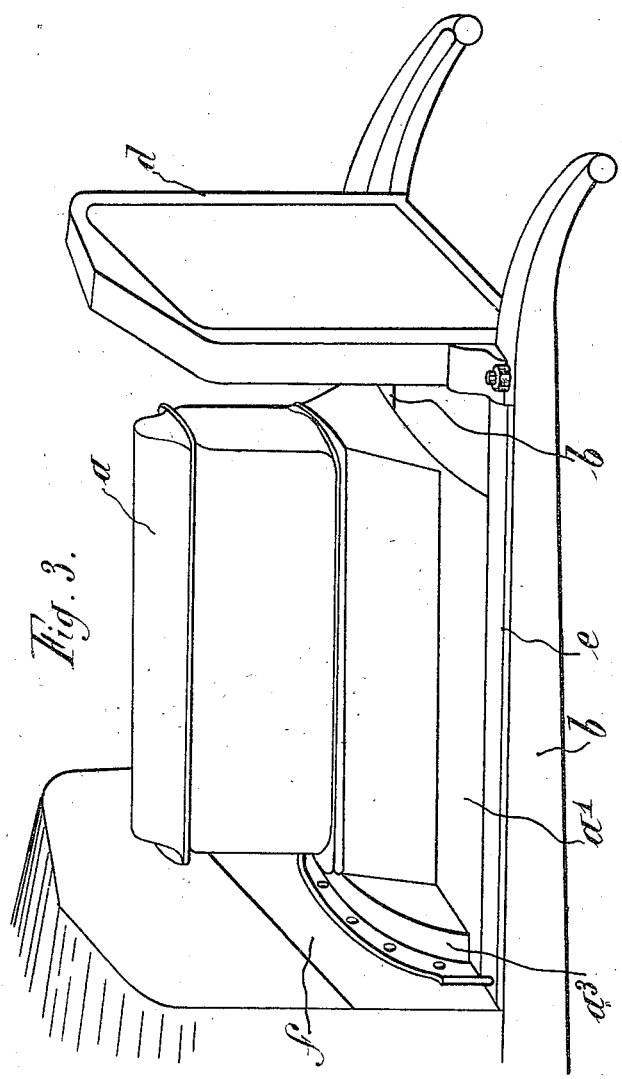

UNITED STATES PATENT OFFICE.

MARC BIRKIGT, OF BOIS-COLOMBES, FRANCE.

MOTOR-VEHICLE.

1,312,383.   Specification of Letters Patent.   Patented Aug. 5, 1919.

Application filed March 28, 1919. Serial No. 285,888.

*To all whom it may concern:*

Be it known that I, MARC BIRKIGT, engineer, citizen of the Republic of Switzerland, residing at Bois-Colombes, Department of Seine, France, have invented certain new and useful Improvements in Motor-Vehicles, of which the following is a specification.

This invention relates to motor-vehicles and has for its object to secure engines to the frames or chassis of vehicles in a simpler, more mechanical and elegant manner than hitherto.

The invention consists mainly in providing the crank case of engine for vehicles with two lateral arms extending throughout the length of the engine, and of such dimensions that the said arms rest on blocks or supports arranged in the interior of the longitudinal members of the frame, the upper face of the said arms being preferably made flat so that once the engine has been put in place on the vehicle, the said flat top is flush with the upper part of plates secured to the longitudinal members.

The invention comprises certain other arrangements, more explicitly referred to hereinafter and claimed in the claims.

The invention will be understood from the following description and the accompanying drawings, given by way of example.

Figures 1 and 2 of the said drawing show diagrammatically, respectively in partial section on the line 1—1 of Fig. 2 and in plan, with some parts broken off, a method of securing an engine to a motor vehicle.

Fig. 3 shows diagrammatically the said method of fixing in perspective.

Fig. 4 shows, also diagrammatically, in section on the line 4—4 of Fig. 2, a detail of the said method of fixing.

The upper part of the crank case of an engine $a$ is provided with lateral arms extending throughout the whole length of the engine, each arm being constituted for instance by a box-shaped part $a^1$ which is open at the bottom, and has its vertical longitudinal walls stayed by means of transverse ribs $a^2$ preferably cast with the said crank case.

In the channel irons constituting the longitudinal members $b$ of the chassis of the vehicle, are placed a certain number of blocks or supports $c$, as shown in the drawing, made of any suitable material. A part of any one of the said blocks is introduced into a longitudinal member, and the other side projects therefrom inwardly. The face which is toward the interior is provided with a projection $c^1$ arranged at a certain distance from the upper part of the said block.

The crank case of the engine is given such transverse dimensions that, assuming that the engine is in place, the outer edges of the box-shaped parts $a^1$ rest on the projections. This may be done by machining for instance by milling the inner faces of the blocks which are above the projections and the upper faces of the said projections, as soon as the blocks are secured to the longitudinal members previously erected, so that the outer edges of the box-shaped parts $a^1$ exactly fit into the space left free between the opposite blocks. The blocks are secured to the longitudinal members $b$ and to the edges of the box-shaped parts $a^1$ in any suitable way. The said blocks are hollow so that the bolts for assembling them may be introduced and also for lightening them.

The radiator $d$ is arranged as usual in front of the vehicle, and secured to the plates $e$ which are in turn secured to the longitudinal members $b$ and extended to the rear end of the engine. These plates $e$ have their inner lateral faces in contact with the outer vertical edges of the box-shaped parts $a^1$ and their upper faces flush with the top of the said parts.

In this way, a motor vehicle is obtained in which the engine is arranged in a more satisfactory and elegant manner than in the majority of other engines which leave in the vehicles on which they are mounted, lateral gaps having an unpleasant appearance. Also, the engine unit is constructed in a more mechanical and more practical manner as regards facility of upkeep and interchangeability and rigidity of its fixing, while the arrangement does not imply an appreciable extra weight, as the whole crank case of the engine, as well as the blocks $c$ are preferably made of aluminum or its alloys.

The engine is preferably provided at the rear in a known manner, with a guard $a^3$ intended to receive the fly wheel, the edges of the said guard being connected to the change speed gear case $a^4$ (Fig. 4) and the circular flange of the connection forms a support for the guard plate $f$ of the vehicle.

Obviously the invention is not limited to the construction described, but comprises any modifications within the scope of the claims.

What I claim as my invention and desire to secure by Letters Patent is:—

1. A motor vehicle, characterized by the crank case of its engine being provided with two lateral arms extending throughout the length of the engine and of such dimensions that the said arms rest on blocks or supports arranged in the interior of the longitudinal members of the chassis, the upper face of the said arms having flat faces, such that, once the engine has been put in place on the vehicle, the said flat faces are in line with the upper part of plates secured to the longitudinal members.

2. A motor vehicle as claimed in claim 1, characterized by each of the lateral arms being open at the bottom, the vertical walls of said lateral arms being stayed by transverse ribs preferably integral with the said crank case.

3. A motor vehicle as claimed in claims 1 and 2, characterized by the arrangement, in the channel irons constituting longitudinal members of the chassis of the vehicle, of a certain number of blocks or supports for instance two in each longitudinal member, made of such a shape that a portion of any one of the blocks can be fitted into a longitudinal member, and the other part project from the said longitudinal member inwardly, and by that face of the block which is facing the interior of the vehicle, being provided with a projection arranged at a certain distance from the upper part of the said block.

4. A motor vehicle as claimed in claims 1–3, characterized by the upper crank case of the engine being given such transverse dimensions that the outer edges of the longitudinal arms rest on the projections of the blocks.

5. A motor vehicle as claimed in the preceding claims, characterized by the faces of the blocks which are above the projections, and the upper faces of the said projections being machined, for instance by milling, for the purpose of insuring exact fitting of the engine into the interval comprised between two opposite blocks, such machining being done as soon as the blocks are secured in the longitudinal members previously assembled.

6. A motor vehicle as claimed in the preceding claims, characterized by the blocks being arranged so as to be secured by any suitable means such as bolts, to the longitudinal members, and also to the longitudinal arms of the crank case.

7. A motor vehicle as claimed in the preceding claims, characterized by the radiator being secured to plates which are secured to the upper flanges of the channel irons of the longitudinal members and extended to the rear end of the engine and so made that their inner lateral faces are in contact with the outer edges of the longitudinal arms and that their upper faces are flush with the tops of said longitudinal arms.

8. A motor vehicle as claimed in the preceding claims, characterized by the engine being provided at the rear in the known manner with a guard intended to receive the fly wheel, the edges of the said guard being connected to the crank case of the change speed gear, the circular flange of the connection being utilized as the support for the guard plate of the vehicle.

In testimony whereof I have hereunto set my hand in presence of two subscribing witnesses.

MARC BIRKIGT.

Witnesses:
JOHN F. SIMONS,
PAUL BLUM.

Copies of this patent may be obtained for five cents each, by addressing the "Commissioner of Patents, Washington, D. C."